United States Patent Office 3,576,782
Patented Apr. 27, 1971

3,576,782
REINFORCING FIBER-CONTAINING INJECTION MOLDABLE, THERMOPLASTIC RESINOUS DRY BLEND COMPOSITION AND PROCESS OF PREPARING
Robert A. Molbert, Cuyahoga Falls, and George H. Wear, Mogadore, Ohio, assignors to The General Tire & Rubber Company
No Drawing. Filed May 2, 1969, Ser. No. 821,496
Int. Cl. C08f 45/10
U.S. Cl. 260—41                                   5 Claims

ABSTRACT OF THE DISCLOSURE

This invention concerns a reinforcing fiber-containing, injection moldable, vinyl halide dry-blend composition comprising a homogeneous mixture of a polymeric material comprised predominantly of a polyvinyl halide resin and lesser amounts of other resins, a processing aid, a heat stabilizer, and staple reinforcing fibers and of a process for making this composition.

BACKGROUND OF THE INVENTION

Field of the invention

This invention relates to the field of thermoplastic resin compositions. More particularly, this invention relates to reinforcing fiber-containing thermoplastic resin compositions suitable for injection molding and to a process of making these compositions.

Description of the prior art

It is a well-known practice to incorporate fibers into plastic to enhance the strength of the final product. Such a practice appears most often in products made from theromsetting plastics because they are, on the whole, the strongest and most durable of the plastics and they find wide use where strength and resistance to harsh environments are required. These fiber reinforced thermosetting plastics are fabricated into products by well-known semi-automatic processes such as match molding, transfer molding, compression molding, and hand layup molding.

The huge demand for plastics has lured many fabricators into the field. To remain competitive, many fabricators have sought lower cost plastics and more efficient fabricating processes. A recent innovation has been the substitution of less expensive thermoplastics for thermosetting plastics where the final product will not be exposed to a severe environment. Another innovation has been the proposal to reinforce thermoplastics with fibers and to fabricate products therefrom by high speed processes such as by injection molding. This latter innovation would realize a two-fold economic benefit; a less expensive material would be used and a less expensive process would be used to fabricate the product.

Logical candidates for these innovations are the vinyl halide polymers, such as polyvinyl chloride resins and blends of vinyl halide resins with other thermoplastic resins because of their low cost and their wide variety of physical properties. Vinyl halide resins can be made soft with the aid of plasticizers, tough with the aid of elastomers, and strong with the aid of reinforcing fibers. Unfortunately, severe difficulty has been encountered in compounding vinyl halide resins with reinforcing fibers and fabricating products therefrom by injection molding so that these expected economic benefits have not been realized.

Part of the difficulty lies with the vinyl halide resins. Injection molding requires the plastic to be molten. The melting point of vinyl halide resins is close to their degradation point—the temperature at which the polymer exhibits rapid chemical and physical breakdown. When injection molding straight vinyl halide resins, the temperature of the molten plastic, or "melt" as it is usually called, is maintained at the minimum permissable to give a workable melt viscosity. When reinforcing fibers are added, the viscosity of the melt increases and melt flow, mold filling, and product physicals suffer accordingly. Raising the melt temperature to lower the melt viscosity causes rapid polymer degradation. Switching to lower molecular weight resins (which have slightly lower melting points) gives a lower strength product so that the benefit of fiber reinforcing is partially lost.

Another part of the difficulty lies with the reinforcing fiber. Glass fibers, for instance, are twisted into strands that are bundled and cut in various lengths. When these bundles are blended along with the other dry-blend composition ingredients, they break open and the individual fibers are released. Many of these fragile fibers are broken by the mixing equipment causing a loss in reinforcing power. In addition, some of the fibers form into "fuzzballs" that plug the melt flow during injection molding.

These difficulties have heretofore prevented the realization of an injection moldable, reinforcing fiber-containing, vinyl halide dry-blend composition. The present invention is based upon the discovery that certain combinations of vinyl halide resins, processing aids, heat stabilizers, and reinforcing fibers, prepared by a special process, may be successfully injection molded to produce high quality products.

Therefore, the main object of this invention is a reinforcing fiber-containing, injection moldable, vinyl halide resin dry-blend composition that is bereft of these aforementioned difficulties. Other objects included a process of making these dry-blend compositions that is simple, that utilizes existing equipment, and that is amenable to automatic control.

SUMMARY OF THE INVENTION

This invention concerns a reinforcing fiber-containing injection moldable, vinyl halide dry-blend composition comprising a homogeneous mixture of (1) a polymeric material comprised predominantly of a polyvinyl halide resin and lesser amounts of other resins, (2) a processing aid selected from the group consisting of (poly) styrene-arcylonitrile (poly) methyl methacrylate, and mixtures thereof, (3) a solid tin mercaptide stabilizer, and (4) staple reinforcing fibers.

DESCRIPTION OF THE PREFERRED EMBODIMENT

The dry-blend compositions of this invention are based upon a polymeric material comprised predominantly of a polyvinyl halide resin and lesser amounts of other resins. This description includes polymers and/or copolymers consisting of only one polyvinyl halide resin, such as polyvinyl chloride, polyvinyl halide copolymers, such as polyvinyl chloride/polyvinylidene chloride (Saran®), admixtures comprised predominantly of a polyvinyl halide resin with lesser amounts of other resins, such as a 90/10 blend of polyvinyl chloride/vinyl acetate, admixtures comprised predominantly of a mixture of polyvinyl halide resins with lesser amounts of other resins, such as a 45/45/10 blend of polyvinyl chloride/polyvinylidene chloride/vinyl acetate, and copolymers comprised predominantly of a polyvinyl halide resin with lesser amounts of other resins, such as a 60/40 copolymer of polyvinyl chloride/acrylonitrile (Dynel®).

Examples of other vinyl halides contemplated in this invention includes all of the vinyl halide polymers such as polyvinyl chloride, polyvinylidene chloride, polyvinyl bromide, and polyvinyl fluoride. Examples of other resins, for use in lesser amounts with the polyvinyl halide resins, include those thermoplastics normally compounded with vinyl halides such as vinyl acetate, acrylonitrile, polyvinyl butyral, polyvinyl pyrrolidone, polyvinyl oxazolidone, alkyl vinyl ethers such as methyl vinyl ether, and polyvinyl carbazole. Other examples of polyvinyl halide dryblend polymers contemplated in this invention include polyvinyl chloride, polyvinyl chloride/vinyl acetate blends, polyvinyl chloride/polypropylene blends, and polyvinyl chloride/methyl methacrylate blends.

Vinyl halide resins, such as polyvinyl chloride resin, are generally described in terms of their method of manufacture and their intrinsic viscosity. Thus, polyvinyl chloride is produced in emulsion grade, suspension grade, and bulk grade and in a range of intrinsic viscosities from less than 0.50 to greater than 2.00.

This invention contemplates suspension grade vinyl halide resins as they have a particle size range and bulk density that gives the most desirable flow properties. The particle size of emulsion grade vinyl halid resins is too small and the bulk density too high to give good dryblend flow properties. Conversely, the large pelletized particles of bulk polymerized vinyl halide resins gives too coarse a mixture for proper reinforcing-fiber dispersion.

Intrinsic viscosity is a measure of the moleucular weight of a polymer. This invention contemplates vinyl halide resins having an intrinsic viscosity range of between about 0.75 and about 1.10 and preferably 0.80 as determined by ASTM Test D 1243-66 in cyclohexanone. Vinyl halide polymers having intrinsic viscosities below about 0.75 are generally quite weak and do not display good physical properties. The presence of reinforcing fibers in these polymers is lost, for the most part, in merely raising the physicals to that of an unreinforced, higher molecular weight polymer. Vinyl halide polymers having intrinsic viscosities greater than about 1.10 are generally too tough to injection mold with reinforcing fibers. These polymers have high melt viscosities that are made even higher by the presence of the reinforcing fibers; the extreme shear forces that are required to mix and inject this material drive melt temperatures even higher into the rapid heat degradation range and both the appearance and the physical properties of the final product suffer accordingly. Tests have shown that a vinyl halide resin with an intrinsic viscosity of 0.80 performs best in this invention.

The particle size and intrinsic viscosity requirements described above apply only to the vinyl halide resin portion of the polymeric material. The other resins that appear in lesser amounts than the vinyl halide resin may be in emulsion grade, suspension grade, and chopped bulk polymerized grade form. Also, these other resins may have intrincis viscosities that are without as well as within the range of 0.75 to 1.10 described above.

In the injection molding cycle, the dry blend composition is subjected to extreme shear forces and high temperatures to convert it into a homogeneous melt. With vinyl halide resins, this heating drives the polymer toward its heat degradation temperature. The presence of reinforcing fibers increases the melt viscosity and gives rise to even greater shear forces and higher temperatures. If not controlled, the polymer would quickly reach a point where rapid degradation would destroy the material before or while it is injection molded. To prevent such a buildup of shear forces and possibly polymer degradation, a processing aid is added to the polymer. Processing aids are polymeric materials that upset the regularity of the macromolecular structure and break down the cohesive shear forces before they reach detrimental proportions. The processing aids found useful in the reinforcing fibercontaining, dry-blend compositions of this invention are copolymers of (poly) styrene-acrylonitrile, (poly) methyl methacrylate and mixtures thereof; they prevent polymer degradation during the flux-melting step of the injection molding cycle while not detracting from the physical properties of the final product.

Regardless of the use of processing aids, the temperatures encountered in the injection molding cycle are close enough to the heat degradation point of vinyl halides that a certain amount of degradation takes place. This degradation is, in principle, the splitting off of halide atoms from the macromolecule due to heat activation and the joining of these free atoms with moisture in the air. These halogen acids in turn attack the unsaturation (double bonds) in the macromolecule and corrode the metal surfaces of the injection mold nozzle, sprues, runners, gates, and mold. Heat stabilizers are usually mixed with the polymer to combat this action. Heat stabilizers are organometallic compounds that readily complex with free halogens to prevent their capture by the moisture in the air. In this invention, heat stabilizers must be solid at room temperature to insure the free flowability of the dry-blend composition. Specifically, solid organotin heat stabilizers such as organotin mercaptides have been found to perform the best.

The reinforcing fibers contemplated in this invention are certain types of glass fibers. Glass fibers are generally produced by drawing fibers or filaments from a glass melt through fine orifices. These fibers are joined in multiples of 204 fibers and twisted into strands. Thus, there are 204 fiber strands, 408 fiber strands, 816 fiber strands, and so on. These strands are cut into lengths and aret thereafter known as staple fiber bundles. The staple glass fibers found useful in this invention are those having lengths between about 1/16 inch to about 3/8 inch and having between about 400 to about 800 fibers per bundle. Lengths shorter than about 1/16 inch do not provide much reinforcement to the plastic product. Lengths longer than about 3/8 inch tend to form plugs and foul in the mold runners. Fiber bundles of less than about 400 fibers per bundle require so many bundles per unit weight of glass that composition homogeniety is difficult to achieve. Fiber bundles of more than about 800 fibers per bundle are too big to blend into the composition and form into "fuzz-balls" that plug in the nozzle of the injection molding machine. The most successful reinforcing fiber found was Johns-Manville Type 508X staple glass fiber of about 1/4 inch in length and containing what appears to be about 408 fibers per bundle. The amount of glass fibers usable in this invention appear to lie in a range of from about 5 to about 50 parts glass fibers per 100 parts of total polymer with about 20 parts of glass fibers per 100 parts total polymer being the optimum for strength and cost purposes.

Other additives may normally be included in the dryblend composition, as long as they are in the dry form, such as lubricants, pigments, fillers, etc.

The process of preparing this dry-blend composition is extremely important to the success of its use as an injection molding compound. If not prepared by the following process, these compositions will not produce successful injection molded products.

The first step in this process is to homogeneously blend all the composition ingredients *except* the reinforcing fiber. Thus, the polymeric material comprised predominantly of a vinyl halide resin with lesser amounts of other resins, the processing aid, the heat stabilizer, the lubricants, pigments, fillers, etc. are first blended together into a homogeneous mixture. This may be accomplished in any sort of dry-blend mixer such as a ribbon blender. Thereafter, the reinforcing fibers are added and blended under low shear conditions for only a sufficient time necessary to insure a relatively homogeneous mixture. In a low shear blender, such as a Littleford-Lodige Blender, the optimum mixing time is about 15 seconds.

Staple glass fibers of the type used in this invention are extremely fragile. During mixing, some of these fibers are broken so that a part of the reinforcing power of the fibers is lost. In an effort to reduce this breakage to a minimum, the other dry-blend ingredients are first blended into a homogeneous mixture. The reinforcing fibers are then added to the mixture and blended under low shear conditions for the minimum time necessary to obtain a relatively uniform dispersion of fibers. This blending time may be made either shorter or longer depending upon the type of low shear mixing equipment. It should be noted that, if the reinforcing fibers are added along with the separate dry-blend ingredients and all mixed together, the fragile fibers will break in such great numbers that most of the strengthening benefit of the fibers will be lost. In addition, those fibers that do not break may very well clump into "fuzz-balls" and prevent proper dispersion in the dry-blend.

The following examples are presented to show one skilled in the art how to practice this invention, to demonstrate the efficacy of the novel composition and the process of preparing it, and to compare the operability of the invention with other compositions and process, both known and unknown in the prior art. All parts are parts by weight per 100 parts by weight of total polymer. All footnotes appear at the end of Example 6.

EXAMPLE 1

A reciprocating screw injection molding machine was set up as follows:

Temperatures: °F.
Nozzle ~360
Front zone 360
Center zone 330
Rear zone 300

Screw speed, r.p.m. 60
Mold temperature, °F. 150–180
Fill speed Slow

Pressures p.s.i.
Boost 1300
Injection 1200
Back 50

Cycle: Sec.
Booster 3
Injection forward 10
Mold closed 40

Three dry-blend compounds, correspoding to Formulas A, B, and C shown below in Table 1, were prepared as follows:

The resins, processing aids, stabilizers, and lubricants were introduced into a Littleford-Lodige Blender (low shear pastry type) at room temperature and mixed for 15 seconds. The glass fibers were then added and mixed in for 15 seconds. The blender was stopped and the mixture transferred to the feed hopper of the injection molding machine.

Specimens were cut from the molded items and physical tests conducted on them; the results appear below:

TABLE 1

| | Formula | | |
|---|---|---|---|
| | A | B | C |
| Resin: Vygen 85 (1) | 90 | 90 | 50 |
| Processing aid: | | | |
| Tyril 780 (2) | 10 | 10 | |
| Elvacite 2010 (3) | | | 50 |
| Stabilizer: Mark 488 (4) | 4 | 4 | 2 |
| Lubricant: stearic acid | 1 | 1 | 1 |
| Fibers: 508X (5) | 20 | | 20 |
| Impact strength, ft.-lb./in notch | 1.4 | 0.2 | 1.0 |
| Flexural strength, p.s.i. | 17,190 | 12,290 | 18,102 |
| Flexural modulus, p.s.i. | 800,000 | 413,000 | 810,000 |
| Tensile strength, p.s.i. | 13,200 | 5,160 | 14,030 |
| Percent elongation | 3 | 47 | 4 |
| Heat distortion at 264 p.s.i.: | | | |
| 10 mil deflection, °C. | 79 | 65 | 85 |
| 60 mil deflection, °C. | 87 | 72 | 91 |

(1), (2), (3), (4), (5)—See notes at end of specification.

This example shows the benefits in physical properties of using reinforcing fibers (Formulas A and C) over not using the fibers (Formula B). Also, this example shows the equality in performance of processing aids of (poly) styrene-acrylonitrile and (poly) methyl methacrylate.

EXAMPLE 2

Four dry-blend compositions, corresponding to Formulas D, E, F, and G shown below in Table 2, were prepared the same way as in Example 1 and injection molded in the same injection molding machine and under similar conditions as in Example 1. Each dry-blend composition was observed as to its flowability, resistance to degradation (color change during molding), and its overall physical properties. These observations are also shown below in Table 2.

TABLE 2

| | Formula | | | |
|---|---|---|---|---|
| | D | E | F | G |
| Resin: | | | | |
| Vygen 65 (I.V.=0.70) (6) | 90 | | | |
| Vygen 85 (I.V.=0.80) (1) | | 90 | | |
| Vygen 110 (I.V.=1.03) (7) | | | 90 | |
| Vygen 120 (I.V.=1.18) (8) | | | | 90 |
| Processing aid: Tyril 780 (2) | 10 | 10 | 10 | 10 |
| Stabilizer: Mark 488 (4) | 4 | 4 | 4 | 4 |
| Lubricant: stearic acid | 1 | 1 | 1 | 1 |
| Reinforcing fibers: 508X (5) | 20 | 20 | 20 | 20 |
| Dry-blend flowability | (a) | (a) | (a) | (a) |
| Resistance to degradation | (b) | (a) | (b) | (c) |
| Overall physical properties | (c) | (a) | (a) | (b) | a Good.
b Fair.
c Poor.
(6), (1), (7), (8), (2), (4), (5)—See notes at end of specification.

This example shows the operable range of intrinsic viscosity of the vinyl halide resin to be between about 0.75 and about 1.10.

EXAMPLE 3

Four dry-blend compositions, corresponding to Formulas H, I, J, and K, shown below in Table 3, were prepared the same way as in Example 1 and injection molded in the same injection molding machine and under similar conditions as in Example 1. Each dry-blend composition was observed as to its flowability, resistance to degradation (color change during molding), and its overall physical properties. These observations are also shown below in Table 3.

TABLE 3

| | Formula | | | |
|---|---|---|---|---|
| | H | I | J | K |
| Resin: Vygen 85 (1) | 90 | 90 | 90 | 90 |
| Processing aid: | | | | |
| (Poly) styrene-acrylonitrile pellets | 10 | | | |
| (Poly) styrene-acrylonitrile chopped pellets°° | | 10 | | |
| (Poly) methyl methacrylate | | | 10 | |
| Modified acrylic resin | | | | 10 |
| Stabilizer: Mark 488 (4) | 4 | 4 | 4 | 4 |
| Lubricant: stearic acid | 1 | 1 | 1 | 1 |
| Reinforcing fibers: 508X (5) | 20 | 20 | 20 | 20 |
| Dry-blend flowability | (a) | (a) | (b) | (b) |
| Resistance to degradation | (a) | (a) | (a) | (b) |
| Overall physical properties | (b) | (a) | (a) | (b) | a Good.
b Fair.
(1), (4), (5)—See notes at end of specification.

This example shows the processing aids (poly) styrene-acrylonitrile and (poly) methyl methacrylate to be operable in this invention. This example also shows that the particle size requirements for the vinyl halide resin is not applicable to the other resins that are present in lesser amounts, i.e., pellets and chopped pellets of (poly) styrene-acrylonitrile processing aid are operable in this invention.

EXAMPLE 4

Four dry-blend compositions, corresponding to Formulas L, M, N, and O, shown below in Table 4, were prepared the same way as in Example 1 and injected molded in the same injection molding machine and under similar conditions as in Example 1. Each dry-blend composition was observed as to its flowability, resistance to degradation (color change during molding), and its overall physical properties. These observations are also shown below in Table 4.

TABLE 4

| | Formula | | | |
|---|---|---|---|---|
| | L | M | N | O |
| Resin: Vygen 85 (1) | 90 | 90 | 90 | 90 |
| Processing aid: Tyril 780 (2) | 10 | 10 | 10 | 10 |
| Stabilizer: | | | | |
| Liquid organo tin mecaptide | 4 | | | |
| Solid organo tin mercaptide | | 4 | | |
| Solid barium-cadmium (salts of organic acids) | | | 4 | |
| Solid lead (di-basic lead salts) | | | | 4 |
| Lubricant: stearic acid | 2 | 2 | 2 | 2 |
| Reinforcing fibers: 508X (5) | 20 | 20 | 20 | 20 |
| Dry-blend flowability | (a) | (b) | (b) | (b) |
| Resistance to degradation | (c) | (b) | (a) | (a) |
| Overall physical properties | (c) | (b) | (a) | (a) | a Poor.
b Good.
c Fair.
(1), (2), (5)—See notes at end of specification.

This example shows that any solid heat stabilizer is usable in the dry-blend compositions of this invention, however, solid organo tin mercaptide performs best as to resistance to degradation and in its effect on overall physical properties.

EXAMPLE 5

Three dry-blend compositions, corresponding to Formulas P, Q, and R, shown below in Table 5, were prepared the same way as in Example 1 and injection molded in the same injection molding machine and under similar conditions as in Example 1. Each dry-blend composition was observed as to its flowability, resistance to degradation (color change during molding), and its overall physical properties. These observations are also shown below in Table 5.

TABLE 5

| | Formula | | |
|---|---|---|---|
| | P | Q | R |
| Resin: Vygen 85 (1) | 90 | 90 | 90 |
| Processing aid: Tyril 780 (2) | 10 | 10 | 10 |
| Stabilizer: | | | |
| Solid organo tin mercaptide (4) | 4 | | |
| Solid organo tin mercaptide (9) | | 4 | |
| Solid dibutyl tin mercaptide (10) | | | 4 |
| Lubricant: stearic acid | 2 | 2 | 2 |
| Reinforcing fibers: 508X (5) | 20 | 20 | 20 |
| Dry-blend flowability | (a) | (a) | (b) |
| Resistance to degradation | (b) | (a) | (b) |
| Overall physical properties | (a) | (a) | (b) | a Good.
b Fair.
(1), (2), (4), (9), (10), (5)—See notes at end of specification.

This example shows that commercially available solid organo tin mercaptides are operable in this invention.

EXAMPLE 6

Six dry-blend compositions, corresponding to Formulas S, T, U, V, W, and X, shown below in Table 6, were prepared the same way as in Example 1 and injection molded in the same injection molding machine and under similar conditions as in Example 1. Each dry-blend composition was observed as to its flowability, its ability to be molded, and its overall physical properties. These observations are also shown below in Table 6.

TABLE 6

| | Formula | | | | | |
|---|---|---|---|---|---|---|
| | S | T | U | V | W | X |
| Resin: Vygen 85 (1) | 90 | 90 | 90 | 90 | 90 | 90 |
| Processing Aid: Tyril 780 (2) | 10 | 10 | 10 | 10 | 10 | 10 |
| Stabilizer: Solid organo tin mercaptide | 4 | 4 | 4 | 4 | 4 | 4 |
| Lubricant: Stearic acid | 1 | 1 | 1 | 1 | 1 | 1 |
| Reinforcing fibers: | | | | | | |
| 1/8 inch 408 fibers/bundle | 20 | | | | | |
| 1/4 inch 408 fibers/bundle | | 20 | | | | |
| 1/2 inch 408 fibers/bundle | | | 20 | | | |
| 1 inch 408 fibers/bundle | | | | 20 | | |
| 1/4 inch 204 fibers/bundle | | | | | 20 | |
| 1/4 inch 1,632 fibers/bundle | | | | | | 20 |
| Dry-blend flowability | (a) | (a) | (b) | (b) | (b) | (b) |
| Ability to be molded | (a) | (a) | (b) | (c) | (b) | (b) | a Good.
b Poor.
c Plug.
(1), (2)—See notes at end of specification.

This example shows the range of usable reinforcing fiber length to be between about 1/16 inch to about 3/8 inch. This example also shows the range of usable fibers/bundle to be between about 400 to about 800 fibers/bundle.

NOTES (1) Vygen 85, a suspension grade PVC resin. The General Tire & Rubber Company
(2) Tyril 780, styrene-acrylonitrile copolymer, Dow Chemical Co.
(3) Elvacite 2010, (poly)methyl methacrylate, Du Pont Chemical Co.
(4) Mark 488, solid organo tin mercaptide, Argus Chemical Co.
(5) 508X, Johns-Manville Type 508X 1/4 inch glass fibers, 408 fibers/bundle Johns-Manville Products Corporation
(6) Vygen 65, a suspension grade PVC resin, The General Tire & Rubber Company
(7) Vygen 110, a suspension grade PVC resin, The General Tire & Rubber Company
(8) Vygen 120, a suspension grade PVC resin, The General Tire & Rubber Company
(9) Solid organo tin mercaptide, Metal & Thermitt Company
(10) Dibutyl tin mercaptide, T-360, Advance Chemical Company

What is claimed is:
1. An injection moldable, freely flowing powdery dry-blend composition comprising a homogeneous mixture of (1) a powdery polymeric material comprised predominantly of a suspension grade polyvinyl halide resin, (2) a processing aid selected from the group consisting of polystyrene-acrylonitrile, polymethyl methacrylate, and mixtures thereof, (3) a solid organotin mercaptide stabilizer, and (4) from about 10 to about 50 parts by weight of staple reinforcing glass fibers per 100 parts of said powdery polymeric material and said processing aid, wherein said staple reinforcing glass fibers are between about 1/16 inch to about 3/8 inch in length and contain between about 400 to about 800 fibers per bundle.

2. The composition of claim 1, wherein said powdery polymeric material comprises a suspension grade polyvinyl halide resin having an intrinsic viscosity of between about 0.75 and 1.10 as determined by ASTM Test D–1243–66.

3. The composition of claim 2 wherein said suspension grade polyvinyl halide resin has an intrinsic viscosity of 0.80.

4. A process of making an injection moldable, freely flowing powdery dry-blend composition comprising the steps of:
   (a) blending together:
      (1) a powdery polymeric material comprised predominantly of a suspension grade polyvinyl halide resin;
      (2) a processing aid selected from the group consisting of polystyrene-acrylonitrile, polymethyl methacrylate, and mixtures thereof; and,
      (3) a solid organotin mercaptide stabilizer;
   (b) adding to said blend from about 10 to about 50 parts by weight of staple reinforcing glass fibers per 100 parts of said powdery polymeric material and said processing aid, wherein said staple reinforcing glass fibers are between about 1/16 inch to about 3/8 inch in length and contain between about 400 to about 800 fibers per bundle; and,
   (c) mixing said blend and said staple reinforcing glass fibers under low shear conditions for about 15 to about 60 seconds to obtain a freely flowing powdery dry-blend composition.

5. The process of claim 4, wherein said step of mixing said blend and said fibers is conducted in a low shear mixer for about 15 seconds.

References Cited

UNITED STATES PATENTS

| | | | |
|---|---|---|---|
| 2,646,417 | 7/1953 | Jennings | 260—897X |
| 3,373,229 | 3/1968 | Philpot et al. | 260—899 |

FOREIGN PATENTS

| | | | |
|---|---|---|---|
| 618,094 | 2/1949 | Great Britain | 260—41 |
| 1,010,043 | 2/1965 | Great Britain | 260—41 |

OTHER REFERENCES

Chevassus, Fernand: The Stabilization of Polyvinyl Chloride, Edward Arnold Pub. LTD, London, 1963, pp. 124, 125, 126.

MORRIS LIEBMAN, Primary Examiner

J. H. DERRINGTON, Assistant Examiner

U.S. Cl. X.R.

260—45.75K, 898, 899

PO-1050
(5/69)

UNITED STATES PATENT OFFICE
CERTIFICATE OF CORRECTION

Patent No. 3,576,782  Dated  April 27, 1971

Inventor(s) Robert A. Molbert et al

It is certified that error appears in the above-identified patent and that said Letters Patent are hereby corrected as shown below:

Column 3, line 20, "halid" should read -- halide --. Column line 52, "intrincis" should read -- intrinsic --. Column 5, Table 1, Formula C, "1.0" should read -- 1.2 --. Column 5, Formula C, "18,102" should read -- 18,100 --. Column 6, Tabl 2, line 23, Formula D, "(b)" should read -- (a) --. Column 6 Table 3, "(Poly) styrene-acrylonitrile chopped pellets cc", should read -- (Poly) styrene-acrylonitrile chopped pellets -

Signed and sealed this 17th day of August 1971.

(SEAL)
Attest:

EDWARD M. FLETCHER, JR.
Attesting Officer

WILLIAM E. SCHUYLER, JR
Commissioner of Patents